3,385,720
WAX LAMINATING COMPOSITION
Karekin G. Arabian, Houston, Tex., assignor to Shell Oil Company, New York, N.Y., a corporation of Delaware
No Drawing. Filed July 17, 1964, Ser. No. 383,518
2 Claims. (Cl. 106—230)

ABSTRACT OF THE DISCLOSURE

A wax laminating composition comprising a microcrystalline wax having suspended therethrough from 2–10% by weight of a polyethylene having a complete crystallization temperature substantially completely above the initial crystallization temperature of the microcrystalline wax.

---

This invention relates to wax coating compositions. More particularly, it relates to wax coating compositions which have high sealing strength to various substrates, and particularly substrates to which adequate seals are normally difficult to obtain.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have had an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene and polypropylene in particular. However, despite the wide use of polymer-coated paper for a wide variety of packaging uses, such laminates have not been a panacea since they too lack many important properties. For example, polyethylene coatings lack the desired resistance to penetration by oxygen, grease, organic vapors and water vapors. In addition, polyethylene coatings have not been found to possess the desired amount of resistance to abrasion and flexing. Polypropylene coatings, while superior to polyethylene in some respects, are deficient in that they lack the rigidity of wax in practical thicknesses and, most importantly, it has been found that polypropylene is particularly difficult to seal effectively to paper coated with wax blends.

The inadequacies of polypropylene in this regard have been particularly serious in the case of bottom seals for bread wrapped in polypropylene film and provided with a printed waxed paper inner wrap. Such coating formulations must provide suitable sealing strength, high blocking temperature characteristics and, in many cases, low melt viscosity to facilitate application.

Although there have been suitable paper-coating wax blends available for sealing paper thus coated to polyethylene film, finding suitable coatings with good sealing strength when laminated to polypropylene film is a much more difficult task. Polypropylene film is being used widely as a packaging wrap because of a greater economy in film requirement at constant film strength relative to polyethylene. The difference in sealing characteristics between polyethylene and polypropylene film is not clearly understood, although it may be associated with the deliberate orientation of the polypropylene film during its manufacture. The problem of sealing paper to polypropylene film is encountered in one instance at the bottom seam of a loaf of bread when polypropylene film is used as an outer wrap and printed wax-coated paper is used for a decorative inner wrap.

It has now been found that suitable seals for difficultly sealed coating materials, such as polypropylene, are obtained by using as a laminating agent a microcrystalline wax containing 2 to 10% by weight of a polyethylene which is characterized as (1) having a temperature of complete crystallization (CCT) substantially completely above the initial crystallization temperature (ICT) of the microcrystalline wax and (2) having an average molecular weight of below about 50,000.

The present invention is therefore not primarily concerned with paraffin crystalline waxes, such as are normally produced from distillate lubricating oil fractions by a dewaxing process. On the contrary, it is concerned with microcrystalline or amorphous waxes, which are normally obtained from the residual fractions containing higher boiling lubricating oil fractions. The waxes obtained from residual petroleum oils, such as by means of vacuum distillation of the latter, are of relatively high molecular weight and appear to be of an entirely different character from paraffin wax. The mass thereof, which to the unaided eye appears to have no crystalline character and to be amorphous, has somewhat plastic characteristics and has refractive indices indicating the principal components to be non-straight-chain hydrocarbons, such as mixtures of isoparaffinic, naphthenic and aromatic hydrocarbons. Magnification reveals a microcrystalline structure, hence, the name "microcrystalline" wax.

While microcrystalline wax is well known as an excellent laminant for a wide variety of materials, including the lamination of paper to polypropylene, it is not by itself a suitable laminant because of its very low blocking temperature (below 77° F.). Such a low blocking temperature would, of course, make it completely impractical to store rolls or stacked sheets of films coated with wax sealant prior to lamination without their sticking, which would result in wasteful loss of the sealant-coated substrate as well as uneven sealant distribution and therefore erratic sealing strength upon subsequent lamination to the other half of the laminated "sandwich."

To produce a laminating material with a suitable blocking temperature, the polyethylenes which can be used in accordance with the invention may be either high or low-density polyethylenes having an average molecular weight of at least 2,000 and up to an average molecular weight of about 50,000. In order that the resultant wax-polymer mixtures be of sufficiently low viscosity to meet the maxium viscosity restrictions of most conventional coating apparatus, it is preferred that the average molecular weight of the polyethylene be below about 25,000. Though the addition of polyethylenes to many kinds of waxes and wax blends is well known and widely practiced in the prior art, it has been found that not all polyethylenes having the above average molecular weight properties are satisfactory. In particular, it has been found that many polyethylenes seriously impair the sealing properties of the wax. Therefore, in addition to the foregoing molecular weight limitations, the polyethylenes to be used in the compositions of the invention must, when they are mixed with the wax in molten form and the mixture is cooled, crystallize substantially completely before any crystallization of the microcrystalline wax takes place. This concept is unique in the blending of polymers with waxes in that, heretofore, it has been the belief and practice that complete compatibility of wax and polymer was desired and usually necessary during all stages of applying wax-polymer compositions. The prior art belief and practice is evidenced by the widespread use of low-density, low-molecular-weight, relative non-crystalline, more wax-soluble polyethylenes and the avoidance of more highly crystalline, less wax-soluble polyethylenes whenever possible if good sealing strength is desired.

The low-molecular-weight polyethylenes which are suitable for the composition of the invention, i.e., those having an average molecular weight of less than about 15,000 must have a narrow distribution of molecular weight components. Moreover, the lower the average molecular weight of the polyethylene, the narrower the molecular weight range must be to yield a polymer mixture having a suitably high crystallization temperature. However, when the average molecular weight of the polymer is above about 15,000, the narrowness of the molecular weight range becomes relatively unimportant since substantially all fractions of the polymer have a suitably high crystallization temperature in wax.

Why polyethylenes having high crystallization temperatures should interfere less with the sealing properties of microcrystalline wax is not known with certainty. However, it is believed that the essentially complete crystallization of the polyethylene results in a highly dispersed solid phase of polymer and a continuous liquid phase of microcrystalline wax. When the mixture is cooled upon application below the crystallization temperature of the wax, the relatively high degree of polymer dispersion and the stability of that phase, since crystallization is complete, avoids any disturbance of the wax crystal morphology.

While the essential components of the sealing composition of the invention are the above-described polyethylene and the microcrystalline wax, relatively small amounts of certain paraffinic waxes and other additives may also be added to raise blocking temperature still further without substantial detriment to the sealing strength of the composition.

Paraffinic waxes which are suitable for raising blocking temperature are those which have a melting point of at least 135° F. and which contain no more than about 30% by weight of non-normal paraffins. Either distillate or residual paraffinic waxes may be used so long as they are within the above-noted property range. The waxes which may be used in accordance with the invention and which are preferred are petroleum waxes derived from the refining of waxy lubricating oil base stocks. By the term "distillate wax" is meant those waxes which are derived from the refining of distillate lubricating oils while the term "residual wax" refers to those waxes which are removed during refining of residual lubricating oils such as bright stock. To be used effectively, such waxes must be highly refined, i.e., they should contain no more than about 2.0% by weight oil and preferably 1.0% by weight or less. The use of less refined (crude) waxes or waxes containing high amounts of non-normal paraffins is to be avoided since the excessive amounts of oil or branched paraffins therein weakens the sealing strength of the microcrystalline wax. Up to about 30% by weight of paraffinic waxes may be employed for this purpose; however, from 5 to 15% by weight is preferred since in that range of concentration substantial effects on blocking tempera- ture are achieved without any significant adverse effect on sealing strength.

A number of additives such as amides, amines, stearates and glycerides may also be used to improve the blocking temperature of the compositions, however, their use is generally to be minimized since they have a deleterious effect on sealing strength. Conversely, there are a number of well known resins and polymeric materials which may be added to raise the sealing strength of the compositions even further. However, they are usually unnecessary and their use likewise is to be minimized since they tend to lower the blocking temperature of the composition.

The invention will be best understood by reference to the following examples:

EXAMPLE I

Initial sealing strength measurements were made on manually prepared laminates of polypropylene film incorporating the blend under test as the adhesive film (no paper used in the sandwich). Seals were made on a steel plate by pressing at 200° F. one piece of polypropylene film firmly together with another piece of film on which the wax to be tested had been melted. The resultant laminate was cooled in the ambient, 75° F., air (thus slowly) and allowed to stand at 73° F. for 16 hours before testing. The sealing strength of each test blend was measured at 73° F. on a Shell Development Sealograph (delamination made with forces 180° apart at a constant speed of 5 inches per minute). The wax component of the test blends was a commercial grade refined microcrystalline wax having an ASTM D-127 melting point of 141° F. and which contained less than 1.0% oil. A number of commercially available polyethylenes covering a wide molecular weight range were tested at 4% by weight concentration in the microcrystalline wax. The results were as follows:

TABLE I.— COMPARISON OF VARIOUS POLYETHYLENES AT 4% WEIGHT CONCENTRATION IN 141° F. MELTING POINT MICROCRYSTALLINE WAX

| Blend No. | Polyethylene Properties | | Sealing Strength of Wax, Polyethylene Blend (grams/inch) |
|---|---|---|---|
| | Average Molecular Weight | Crystallization Temperature Relative to Wax | |
| 1 | 1,500 | Below | 100 |
| 2 | 1,500 | do | 100-225 |
| 3 | 1,500 | do | 100 |
| 4 | 2,000 | do | 100 |
| 5 | 2,000 | do | 100 |
| 6 | 2,500 | do | 100 |
| 7 | 2,500 | do | 100 |
| 8 | 2,500 | Above | 400-525 |
| 9 | 2,500 | do | 330-550 |
| 10 | 2,500 | do | 330-600 |
| 11 | 4,000 | Below | 100 |
| 12 | 7,000 | do | 110-160 |
| 13 | 10,000 | do | 100-160 |
| 14 | 10,000 | do | 100 |
| 15 | 12,000 | do | 100 |
| 16 | 21,000 | Above | 4500-670 |

The foregoing results are quite surprising in that sealing strength of the blend was found to be independent of the average molecular weight of the polyethylene even when the molecular weight was varied over greater than one order of magnitude. Heretofore, it would be expected that the higher molecular weight and therefore more tacky polymers would detract less from the sealing strength of the wax. However, the above data show that blend sealing strengths at constant polymer concentration is achieved, not by higher molecular weight, but by using a polymer the complete crystallization temperature of which is essentially completely above the initial crystallization temperature of the microcrystalline wax. It is of further interest to note that, of the blends containing high complete-crystallization-temperature polyethylene, the sealing strength of the one containing 21,000 molecular weight polyethylene was only slightly higher than the one containing 2,500 molecular weight polyethylene. Thus nearly a ten-fold difference in molecular weight resulted in a sealing strength increase of only about 10–20%.

EXAMPLE II

The important relationship of complete crystallization temperature (CCT) to sealing strength is shown in the following example.

TABLE II.—RELATIONSHIP BETWEEN COMPLETE CRYSTALLIZATION TEMPERATURE (CCT) OF POLYETHYLENE AND SEALING STRENGTH IN MICROCRYSTALLINE WAX

| Polyethylene Properties | | Sealing Strength of 4% PE, 96% Microcrystalline Wax Blend [b] (grams/inch) |
|---|---|---|
| Average Molecular Weight | Percent wt. Crystallized at 140° F.[a] | |
| 21,000 (Wide M. Wt. range) | 92 | 450–670 |
| 2,500 (Narrow M. Wt. range) | 85 | 330–600 |
| 2,500 (Wide M. Wt. range) | 79 | 100–160 |

[a] Percent crystallized was determined by dissolving each polyethylene at 300° F. in a lubricating oil fraction which approximates the microcrystalline wax in molecular weight and in general composition, cooling the mixture to 140° F., filtering the mixture in an oven at 140° F., determining the concentration of polyethylene in the filtrate, and determining the amount crystallized by difference. The initial crystallization temperature of the wax is 140° F. Thus, by complete crystallization of the polyethylene, it is meant that upon cooling the polyethylene is substantially, that is at least about 80% and preferably at least about 85% crystallized before the initial crystallization of the wax.
[b] Polypropylene to polypropylene laminate.

The following example shows that the highest concentration of polyethylene which can be added without reducing sealing strength below the practical limit of about 200 grams/inch is severely limited.

EXAMPLE III

Several laminates were prepared and tested in the same manner as Example I in which the laminating composition consisted of the same microcrystalline wax blended with various concentrations of two different polyethylenes, both of which had a complete crystallization temperature above that of the wax. The results were as follows:

TABLE III.—EFFECT OF POLYETHYLENE CONCENTRATION ON SEAL STRENGTH POLYETHYLENE

| Blend No. | Average Molecular Weight | Concentration (Percent by weight) | Sealing Strength (grams/inch) |
|---|---|---|---|
| 17 | 2,500 | 2 | 440–670 |
| 18 | 2,500 | 4 | 330–600 |
| 19 | 2,500 | 10 | 100 |
| 20 | 21,000 | 4 | 450–670 |
| 21 | 21,000 | 10 | 335–560 |

Though the foregoing data indicate that the higher molecular weight polyethylene can be used at concentrations as high as 10% by weight, it is necessary that the lower molecular weight polyethylenes (i.e., below about 10,000) be used at concentrations not exceeding about 8% by weight. However, because the higher molecular weight polyethylene raises the viscosity of the blend to a high level, it is likewise preferred to use no more than about 8% of the high-molecular-weight polyethylene.

To obtain significant increase in blocking temperatures by the addition of polyethylenes it is necessary to use at least about 2% by weight. However, in view of the preceding data, it is preferred to use an amount of polyethylene which is equivalent to 3–6% by weight of the sum of the wax and polyethylene.

In addition to the basic formulation of microcrystalline wax and high CCT polyethylene, a limited amount of paraffinic wax can be added thereto to augment further the blocking temperature as is shown in the following example.

EXAMPLE IV

Four microcrystalline wax-polyethylene laminating compositions were prepared and tested in the same manner as Example I. Each composition contained 4% by weight high CCT polyethylene. In three of the compositions, the amount of microcrystalline wax was diminished by the addition of 10 or 20% by weight of one of the following paraffinic waxes:

Wax A: 141–143° F. ASTM D–87 Melting Point Paraffinic Wax containing less than 30% by weight non-normal paraffins Wax B: 158–162° F. ASTM D–87 Melting Point Paraffinic Wax containing greater than 40% by weight non-normal paraffins In addition to sealing strength, the blocking temperature of the blends were also determined. In reporting the results of the blocking test, the first of the two figures given for each test is the lowest temperature at which any surface damage is observed, while the second figure denotes the lowest temperature at which at least 50% of the surface was damaged. The results were as follows:

TABLE IV.—EFFECT OF ADDITION OF PARAFFINIC WAX TO MICROCRYSTALLINE WAX-HIGH CCT POLYETHYLENE LAMINATING COMPOSITIONS

| Blend No. | Composition, percent by weight | | | Properties of Laminant | |
|---|---|---|---|---|---|
| | Microcrystalline Wax (MX) | Polyethylene [a] | Paraffinic Wax (Type) | Sealing Strength (grams/inch) | Blocking Temperature (° F.) |
| 22 | 96 | 4 | | 330–600 | 96/101 |
| 23 | 86 | 4 | 10 (A) | 100–250 | 105/111 |
| 24 | 76 | 4 | 20 (A) | 100 | 115/119 |
| 25 | 86 | 4 | 10 (B) | 100 | |

[a] Average molecular weight 2,500, complete crystallization temperature above initial crystallization temperature of both MX and paraffinic wax.

The foregoing data indicate that paraffinic waxes are quite effective to raise blocking temperature but can be used only in limited amounts. More specifically, however, only the lower melting wax (A) can be used because the high melting components in wax (B) are extremely deleterious to sealing strength of the blend. It is clear from the above data that waxes containing less than 30% isoparaffins and melting below 145° F. can be used up to 10% by weight. As will be shown hereinbelow, it can be used in still higher concentrations under certain circumstances.

It is, of course, well known in the coating and laminating field to employ special organic additives to improve the adhesiveness of various laminating materials. In rubber formulations, these are known as tackifiers. Examples of such materials, which are frequently polymers, are elastomeric polyisobutylene, polyvinyl, stearates, polyterpene resins, rosins, hydrogenated rosins, pentaerythritol and glycerol esters of rosin and the like. It is also well known in the art to employ special additives to improve the surface properties of coatings. Such materials are generally relatively high molecular fatty acid-derived surfactants which are exemplified by octadecylamine acetate, octadecylamine, cocoamide, stearamide, oleamides, sorbitan monostearate, and distilled monoglycerides such as from hydrogenated lard.

It has been found that such additives are significantly more effective in the compositions of the invention which contain the high CCT polyethylene described herein than in microcrystalline wax containing the conventional low CCT polyethylenes used heretofore. This important and unexpected advantage is illustrated by the following example.

EXAMPLE V

Three laminating compositions were prepared, in two of which high CCT polyethylene in accordance with the invention was used and in the third of which a conventional low CCT polyethylene was employed. The relative amounts of each component were the same in all three compositions and each contained in addition to the microcrystalline wax and polyethylene paraffin wax and small amounts of a combination additive consisting of 83% glycerol ester of hydrogenated rosin and 17% distilled monoglycerides. The sealing strength of these formulations were then compared with two laminant blends containing the same type and concentrations of wax and polyethylene but without the paraffinic wax or the additive. The greater effectiveness of the additives in the composition of the invention is shown in the following table.

TABLE V.—EFFECT OF ADDITIVES ON SEALING STRENGTH

| Blend No. | Composition, percent by weight | | | | | Minimum Sealing Strength (grams/inch) |
|---|---|---|---|---|---|---|
| | MX Wax | High CCT Poly-ethylene a | Low CCT Poly-ethylene b | Paraf-finic Wax c | Combina-tion Additive | |
| 26 | 80 | 4 | | 10 | 6 | 450 |
| 27 | 96 | 4 | | | | 330 |
| 28 | 80 | | 4 | 10 | 6 | 150 |
| 29 | 96 | | 4 | | | 100 | a 2,500 avg. molecular weight.
b 10,000 avg. molecular weight.
c 141–143 °F. ASTM D-87 Melting Point Paraffinic Wax.

The above data are quite interesting and extremely surprising when considered in view of the fact that most additives are less capable of improving the basic property for which they are used when that basic property is relatively high. That is to say, additives are normally more effective when the basic property for which they are used is also low. However, the situation here appears to be reversed in that the sealing strength additives used here were at least as effective or even more effective in the high-sealing-strength blends of the invention than in the low-sealing-strength blends which are characteristic of the prior art.

The superior effectiveness of such additives in the compositions of the invention is of great importance in that it makes practical the blending of greater amounts of paraffinic wax into the blend (for improving blocking temperature) while still maintaining adequate and even improved sealing strength. This is shown by the following example.

EXAMPLE VI

Six laminating wax-high CCT polyethylene blends were prepared and tested as to sealing properties in the manner set forth in Example I and, in addition, the blocking temperature of each was determined. Four different additives were compared as follows:

wax, the detrimental effect on sealing strength of high amounts of paraffinic wax can be offset. Thus, both satisfactory sealing strength and high blocking temperatures are attainable. From 2 to 10% by weight of such sealing strength additives should be used.

As mentioned hereinbefore, other blocking temperature improver additives may be used to supplement paraffinic waxes for this purpose. Because such additives likewise degrade sealing strength of the laminant, they must be used only in small concentrations, preferably on the order of no more than about 1% by weight. The use of such additives is illustrated in the following example.

EXAMPLE VII

A number of proprietary surfactant-type blocking temperature improvers were added at a weight ratio of 1:100 to separate samples of a basic laminant blend having the following composition:

Percent by weight
Microcrystalline wax _____ 81
Paraffinic wax (141–143° F. melting point) _____ 10
Glycerol ester of hydrogenated rosin _____ 5
High CCT polyethylene, 2,500 avg. mol. wt. _____ 4

Each of the resultant blends was tested in the manner described in Example I as well as for blocking temperature. The results are given in the following table.

TABLE VII.—EFFECT OF SUPPLEMENTAL BLOCKING TEMPERATURE ADDITIVES

| Blend No. | Blocking Temperature Additive | Properties of Laminant | |
|---|---|---|---|
| | | Sealing Strength (grams/inch) | Blocking Temperature (° F.) |
| 36 (base) | None | 560–670 | 101/103 |
| 37 | Octadecylamine | 110 | 107/113 |
| 38 | Octadecylamine acetate | 225 | 103/106 |
| 39 | Cocoamide | 175 | 110/113 |
| 40 | Stearamide | 110 | 122/126 |
| 41 | Distilled hydrogenated lard monoglycerides. | 450–560 | 108/112 |

TABLE VI.—USE OF ADDITIVES TO FACILITATE BLENDING ADDITIONAL AMOUNTS OF PARAFFINIC WAX FOR BLOCKING TEMPERATURE IMPROVEMENT

| Blend No. | Composition of Laminant, percent by weight | | | | Properties of Laminant | |
|---|---|---|---|---|---|---|
| | MX Wax | High CCT Poly-ethylene a | Paraf-finic Wax b | Sealing Strength Additive | Sealing Strength (grams/inch) | Blocking Temperature, (° F.) |
| 30 | 71 | 4 | 20 | c 5 | 335–560 | 102/104 |
| 31 | 71 | 4 | 20 | d 5 | 335–670 | 102/105 |
| 32 | 71 | 4 | 20 | e 5 | 335–780 | 100/103 |
| 33 | 71 | 4 | 20 | f 5 | 450–670 | 105/106 |
| 34 | 76 | 4 | 20 | | 100 | 115/119 |
| 35 | 96 | 4 | | | 330–600 | 96/101 | a Average molecular weight 2,500.
b 141–143° F. ASTM D-87 Melting Point Paraffinic Wax.
c Polyterpene resin.
d Pentaerythritol resin hydrogenated rosin.
e Terpene resin.
f Glycerol ester of hydrogenated rosin.

By comparing blends 34 and 35, it is readily apparent that the use of substantial amounts of paraffinic wax by itself to increase blocking temperature would be impractical since the paraffinic wax reduces sealing strength excessively at concentrations over about 10% by weight. (See Table III and the discussion immediately following.) However, because of the exceptional additive susceptibility of the high CCT polyethylene-containing microcrystalline From the above data, it is apparent that blocking temperature additives vary widely both in their efficacy to improve blocking temperature and in their common deleterious effect on sealing strength. The distilled monoglycerides, which are commercially available under the registered trade mark of Myverol, are particularly effective in the composition of the invention and are therefore preferred supplemental additives in that they gave quite high improvement in blocking temperature with only a small amount of deleterious effect on sealing strength.

The following compositions in accordance with the invention are particularly preferred because of their outstanding properties in all essential respects.

EXAMPLE VIII

TABLE VIII.—PROPERTIES OF PREFERRED LAMINATING COMPOSITIONS

|  | Blend Numbers | |
|---|---|---|
|  | 42 | 43 |
| Composition, percent by wt.: |  |  |
| Microcrystalline wax | 80 | 70.5 |
| Paraffinic wax | 10 | 20 |
| High CCT polyethylene (2,500 avg. mol wt.) | 4 | 4 |
| Glycerol ester of hydrogenated resin | 5 | 5 |
| Distilled monoglycerides | 1 | 0.5 |
| Properties: |  |  |
| Sealing strength, grams/inch [a] | 450 | 450 |
| Blocking temperature | 115/116 | 114/115 |
| Viscosity, cps. at— |  |  |
| 220° F | 15.7 | 13.7 |
| 270° F | 9.5 | 8.0 |
| Cloud point | 203 | 200 |
| NPA color | L 2.0 | L 1.5 |
| Penetration, dmm. at— |  |  |
| 77° F | 14 | 15 |
| 100° F | 38 | 39 |

[a] The sealing strengths were measured at 73° F. on the Shell Development Sealograph (delamination made with forces 180° apart at speeds of 5 inches/minute). The specimens were prepared from laminates of sulfite paper and polypropylene made on a Haida wax-coating machine. The sulfite paper for lamination was prepared by two-side dip coating 9-inch U.S. testing paper (M-654). The filled side of the paper (normally used for printing) was laminated to the polypropylene and was coated with about 6 lbs. per ream of surface wax (12 lbs. per ream total wax—bottom side scraped). Laminations were made at 225° F. with web speeds of 50 ft./minute and cold roll temperatures of 45-50° F. All laminates (1-inch wide strips) were stored for 16 hours at 73° F. and 50— relative humidity before testing.

The above preferred laminant compositions exhibit not high sealing strength to polypropylene and high blocking temperature but, quite importantly from the standpoint of application by present day conventional coating apparatus, very low melt viscosity.

When low CCT polyethylene was used in the otherwise identical formulation as blend No. 42, the sealing strength of the laminant was only 150 g./in.

The unique properties of the compositions of the invention are effectively demonstrated differentially by the following example which shows the sealability of four prior art laminant formulations in laminating cellophane, polyethylene and polypropylene.

EXAMPLE IX phane or polyethylene and that the prior art formulations, which are wholly satisfactory for cellophane or polyethylene, were nevertheless inadequate for laminating polypropylene.

Because of the severe problem in laminating polypropylene, that film material has been used herein as a most severe criterion for comparing and measuring the sealing strength of the composition of the invention. Though the compositions of the invention are unique in their superior sealing strength to polypropylene, they exhibit similar superior properties as to other widely used substrates. This is shown by the following example.

EXAMPLE X

A laminant composition identical to blend No. 42 (see Example VII) was tested as to sealing strength with a number of substrates by sealing two sheets of the substrate with the laminant. Laminates were made at 200° F., air-cooled, and then stored 16 hours at 73° F. Delamination was accomplished on the aforementioned Shell Sealograph with a 180-degree of delamination. The results were as follows:

TABLE X.—SEALING STRENGTH OF THE INVENTION COMPOSITION WITH SEVERAL SUBSTRATES BY DIFFERENT MANUFACTURERS

| Substrate: | Sealing strength at 73° F., (grams/inch) |
|---|---|
| Cellophane coated with water-resistant resin | 450–670 |
| Cellophane, uncoated | 450–785 |
| Polyethylene film—Manufacturer A | 560 |
| Polyethylene film—Manufacturer B | 450–670 |
| Aluminum foil—Manufacturer C: |  |
| High-gloss side laminated to high-gloss side | 560 |
| Satin-finish side laminated to satin-finish side | 560 |
| Aluminum foil—Manufacturer D | 780 |
| Aluminum foil—Manufacturer E: Paper glued to one side (aluminum side) wiped with toluene before lamination) | 335–450 |
| Polypropylene film, 1 mil thickness, Manufacturer F | 450–670 |
| Polypropylene film, 0.87 mil thickness, Manufacturer G | 450–670 |

From the foregoing data, it can readily be seen that the

TABLE IX.—SEALABILITY OF PRIOR ART LAMINATING COMPOSITIONS TO VARIOUS SUBSTRATES

| Blend No. | Components | Composition (percent wt.) | Sealing Strength, max./min. (grams/inch) | | |
|---|---|---|---|---|---|
|  |  |  | With Cellophane | With Polyethylene | With Polypropylene |
| 44 | Microcrystalline wax | 81 | CFT [e] | CFT | 163/75 |
|  | Paraffinic wax [a] | 14 |  |  |  |
|  | Low CCT polyethylene [b] | 5 |  |  |  |
| 45 | Microcrystalline wax | 80 | CFT | 300/300 | 214/100 |
|  | Paraffinic wax [a] | 12.5 |  |  |  |
|  | Polyisobutylene [c] | 2.5 |  |  |  |
|  | Low CCT polyethylene | 5 |  |  |  |
| 46 | Microcrystalline wax | 80 | CFT | CFT | 270/146 |
|  | Paraffinic wax [a] | 10 |  |  |  |
|  | Polybutenes [d] | 5 |  |  |  |
|  | Low CCT polyethylene | 5 |  |  |  |
| 47 | Microcrystalline wax | 75 | CFT | CFT | 234/100 |
|  | Paraffinic wax [a] | 10 |  |  |  |
|  | Polyterpene resin | 10 |  |  |  |
|  | Low CCT polyethylene | 5 |  |  |  |

[a] 141–143° F. ASTM D–87 melting point.
[b] Average molecular weight 10,000.
[c] Average molecular weight 64,000–81,000.
[d] Average molecular weight about 1,500, from polymerization of normal and branched chain butenes.
[e] Complete fiber tear corresponds to a sealing strength above 300 grams/inch.

The sealing strength of each of the above-listed formulations was obtained in the manner of Example I except that the laminant was used to join sulfite paper to each of the three film materials. The data show that the lamination of polypropylene is much more difficult than either cellocompositions of the inventions are likewise superior for laminating other substrates, having a wide variety of surfaces both as to smoothness and porosity, as well as the heretofore particularly troublesome polypropylene film.

I claim as my invention:

1. An improved wax laminating composition consisting essentially of (a) microcrystalline wax having suspended therethrough (b) about 4% by weight (basis total composition) of a polyethylene, having an average molecular weight of about 2,500, at least 80% of which polyethylene crystallizes above the initial crystallization temperature of the microcrystalline wax and which further contains (c) about 5% by weight (basis total composition) of glycerol ester of hydrogenated rosin (d) 0.5 to 1.0% (basis total composition distilled monoglycerides, and (e) 10 to 20% by weight (basis total composition) paraffinic distillate wax having an ASTM D-87 melting point between 135° F. and 145° F. and which contains no more than about 30% by weight non-normal paraffins.

2. An improved wax laminating composition consisting essentially of (a) microcrystalline wax having suspended therethrough (b) from 3 to 6% by weight (basis total composition) of a polyethylene having an average molecular weight of about 2500 and at least 80% of which polyethylene crystallizes above the initial crystallization temperature of the microcrystalline wax, and which further contains (c) about 5% by weight (basis total composition) of an organic sealing strength additive selected from the group consisting of polyterpene resins, pentaerythritol esters of hydrogenated rosin and glycerol esters of hydrogenated rosin (d) 0.5 to 1.0% by weight (basis total composition) distilled monoglycerides and (e) 10 to 20% by weight (basis total composition) paraffinic distillate wax having an ASTM D-87 melting point between 135° F. and 145° F. and which contains no more than about 30% by weight non-normal paraffins.

References Cited

UNITED STATES PATENTS

| | | | |
|---|---|---|---|
| 3,024,167 | 3/1962 | Butler | 260—28.5 |
| 2,556,278 | 6/1955 | Irvine | 99—166 |
| 3,236,796 | 2/1966 | Moyer | 260—28.5 |
| 3,048,551 | 8/1962 | Lutz | 106—270 |
| 2,842,508 | 7/1958 | Sterh | 260—28.5 |
| 2,471,102 | 5/1949 | Fish | 260—28.5 |
| 3,179,611 | 4/1965 | Richardson | 260—28.5 |
| 2,859,190 | 11/1958 | Cubberly | 260—28.5 |

JULIUS FROME, *Primary Examiner.*